United States Patent
Kerschbaum et al.

(10) Patent No.: US 12,445,389 B2
(45) Date of Patent: Oct. 14, 2025

(54) COMMUNICATION CONTROLLER AND METHOD FOR TRANSMITTING TIME-CRITICAL DATA WITHIN A COMMUNICATION SYSTEM

(71) Applicant: Siemens Aktiengesellschaft, Munich (DE)

(72) Inventors: Sven Kerschbaum, Fürth (DE); Stephan Höme, Schwabach (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 18/695,929

(22) PCT Filed: Sep. 1, 2022

(86) PCT No.: PCT/EP2022/074334
§ 371 (c)(1),
(2) Date: Mar. 27, 2024

(87) PCT Pub. No.: WO2023/052028
PCT Pub. Date: Apr. 6, 2023

(65) Prior Publication Data
US 2025/0126075 A1    Apr. 17, 2025

(30) Foreign Application Priority Data

Sep. 28, 2021 (EP) ..................... 21199388

(51) Int. Cl.
*G06F 15/173* (2006.01)
*H04L 47/2416* (2022.01)
(Continued)

(52) U.S. Cl.
CPC ........ *H04L 47/781* (2013.01); *H04L 47/2416* (2013.01); *H04L 47/6215* (2013.01)

(58) Field of Classification Search
CPC ............... H04L 47/781; H04L 47/2416; H04L 47/6215
See application file for complete search history.

(56) References Cited

U.S. PATENT DOCUMENTS 7,142,563 B1 * 11/2006 Lin .................. H04L 47/10
370/469
8,160,072 B1 * 4/2012 Gnanasekaran .... H04L 47/2441
370/468
(Continued)

FOREIGN PATENT DOCUMENTS

| EP | 3038325 | 6/2016 |
|----|---------|--------|
| WO | 2019001718 | 1/2019 |
| WO | 2020114706 | 6/2020 |

OTHER PUBLICATIONS

Nasrallah et al. "Reconfiguration Algorithms for High Precision Communications in Time Sensitive Networks: Time-Aware Shaper Configuration with Institute of Electrical and Electronics Engineers (IEEE) 802.10cc (Extended Version)" (arxiv.org, Cornell University Library, 201 OLIN Library Cornell University Ithaca, NY 14853, Jun. 27, 2019.

(Continued)

Primary Examiner — John B Walsh
(74) Attorney, Agent, or Firm — Cozen O'Connor

(57) ABSTRACT

Method for transmitting time-critical data within a communication system, wherein selected datagrams are assigned to data streams and transmitted from first communication devices to second communication devices on paths containing third communication devices, where a superordinate communication controller ascertains a respective path for a respective data stream and, in the event of sufficient availability, reserves resources transmission of the respective data stream via the third communication devices, configures at least third communication devices, connected to a first or second communication device, such that datagrams assigned (Continued)

to data streams are each queued in transmission queues reserved for data streams and otherwise configures at least the third communication devices, connected to a first or second communication device, in each case at least temporarily such that datagrams assigned to selected data streams are queued in a transmission queue for data traffic handled without a specific quality of service guarantee.

21 Claims, 2 Drawing Sheets

(51) Int. Cl.
    *H04L 47/62*     (2022.01)
    *H04L 47/78*     (2022.01)

(56) References Cited

U.S. PATENT DOCUMENTS

| | | |
|---|---|---|
| 10,298,380 B2 | 5/2019 | Kiessling |
| 11,467,566 B2 | 10/2022 | Steindl |
| 2004/0196855 A1* | 10/2004 | Davies ................ H04L 47/2433 370/395.42 |
| 2006/0092963 A1 | 5/2006 | Bakre et al. |
| 2012/0002541 A1 | 1/2012 | Lee et al. |

OTHER PUBLICATIONS

PCT International Search Report dated Nov. 25, 2022 based on PCT/EP2022/074334 filed Sep. 1, 2022.

* cited by examiner

COMMUNICATION CONTROLLER AND METHOD FOR TRANSMITTING TIME-CRITICAL DATA WITHIN A COMMUNICATION SYSTEM

CROSS-REFERENCE TO RELATED APPLICATIONS

This is a U.S. national stage of application No. PCT/EP2022/074334 filed 1 Sep. 2022. Priority is claimed on European Application No. 21199388.6 filed 28 Sep. 2021, the content of which is incorporated herein by reference in its entirety.

BACKGROUND OF THE INVENTION

1. Field of the Invention

The present invention relates to a communication controller and method for transmitting time-critical data, in particular control data in an industrial automation system, within a communication system.

2. Description of the Related Art

An industrial automation system usually comprises a multiplicity of automation devices networked to one another via an industrial communication network and is used to control or regulate installations, machines and devices as part of production or process automation. On account of time-critical boundary conditions in industrial automation systems, real-time communication protocols, such as PROFINET, PROFIBUS, Real-Time Ethernet or Time-Sensitive Networking (TSN), are predominantly used for communication between automation devices.

On account of use for often extremely different applications, problems may arise in Ethernet-based communication networks, for example, if network resources for transmitting data streams or data frames with real-time requirements are used in a competing manner to transmit data frames with a large payload content without special quality of service requirements. This can result in data streams or data frames with real-time requirements not being transmitted according to a requested or required quality of service.

According to EP 3 038 325 A1, in order to transmit data in a communication network of an industrial automation system, first data frames comprising control data for the automation system are transmitted only within periodic first intervals of time via coupling communication devices of the communication network. Second data frames, which are assigned to data streams comprising sequences of data frames, and third data frames, for the transmission of which no quality of service or a quality of service below a predefined threshold value is specified, are transmitted within periodic second intervals of time. The first intervals of time are subdivided into first and second sub-intervals. First data frames to be forwarded are inserted into a first or second queue in alternating sub-intervals and are removed in an alternating manner from the queues for forwarding.

WO 2019/001718 A1 describes a method for transmitting data that makes it possible to combine protected communication and a small amount of network configuration effort. Here, when resources for transmitting data streams (streams) from a transmitter to a receiver are reserved, at least two paths that are redundant at least in sections are reserved. Duplicate filters at network nodes assigned to redundant path sections are automatically configured during resource reservation by extending a reservation protocol.

WO 2020/114706 A1 discloses a communication system for transmitting time-critical data, in which selected datagrams are assigned to data streams and are transmitted via paths for the data streams. Reservation requests, each comprising at least details of a first and a second network node and quality of service parameters, are each transmitted to a superordinate communication controller by a reservation functional component, assigned to a first or a second communication terminal or to a communication device that is connected to the latter and forwards datagrams, in order to reserve resources to be provided by communication devices for the purpose of transmitting data streams. In the case of reservation requests, the superordinate communication controller respectively determines a path and checks whether sufficient resources for transmitting the data streams, while complying with the specified quality of service parameters, are available in communication devices along the respective path and determines a proposed local cycle duration for selected communication devices.

"Reconfiguration Algorithms for High Precision Communications in Time Sensitive Networks: Time-Aware Shaper Configuration with Institute of Electrical Electronics and Engineers (IEEE) 802.10cc (Extended Version)" (ARXIV. ORG, CORNELL UNIVERSITY LIBRARY, 201 OLIN LIBRARY CORNELL UNIVERSITY ITHACA, NY 14853, Jun. 27, 2019 (2019 Jun. 27)) describes a method for transmitting time-critical data within a communication system. Here, selected datagrams are assigned to data streams and are transmitted from first communication devices to second communication devices via paths comprising third communication devices. A superordinate communication controller respectively determines a path for the respective data stream in the and, case of sufficient availability, reserves resources for transmitting the respective data stream via the third communication devices. If sufficient resources are available, then the superordinate communication controller configures at least each of the third communication devices, connected to a first or second communication device, such that datagrams assigned to data streams are each queued in transmission queues reserved for data streams.

US 2006/092963 A1 relates to a method for communicating within a network, in which a profile for a data flow in a wireless network client with an assured quality of service (QOS) is initially generated. Upon receiving the profile, a configuration parameter for achieving the QoS is created for the data flow. A layer of a data path assigned to the data flow is configured in accordance with this configuration parameter. If sufficient resources are not available, handling as best-effort data traffic is effected.

Even in the case of a central stream reservation model, stream reservation requests are fundamentally transmitted independently of one another to a central network controller (CNC) or to a superordinate communication controller. After receiving a stream reservation request, the central network controller immediately schedules reservation requests if sufficient resources are available in the respective communication system. This is usually referred to as incremental scheduling. This can now result in the central network controller having to reject a stream reservation request for a process that has a high priority per se, in particular a time-critical control process in an industrial automation system, if sufficient system resources are no longer available, such as after reserving system resources for a less time-critical application, for example, a data analysis application.

SUMMARY OF THE INVENTION

It is an object of the present invention to provide an apparatus and method for transmitting time-critical data within a communication system, where the method enables efficient resource reservation and reliable setup of data streams for transmitting high-priority data.

This and other objects and advantages are achieved in accordance with the invention by a communication controller and by a method for transmitting time-critical data within a communication system, where selected datagrams are assigned to data streams and are transmitted from first communication devices to second communication devices via paths comprising third communication devices. In order to announce data streams that can be subscribed to, the first communication devices each transmit first datagrams comprising a data stream identifier and specify quality of service parameters for the respective data stream in the first datagrams. In contrast, in order to reserve resources to be provided by the third communication devices for transmitting the data streams, the second communication devices each transmit second datagrams and specify the respective data stream identifier in the second datagrams. In response to the first and second datagrams, a superordinate communication controller, in particular a central network controller, respectively determines a path for the respective data stream and, in the event of sufficient availability, reserves resources for transmitting the respective data stream via the third communication devices.

The resources to be provided by the third communication devices, in particular, comprise, for example, usable transmission time windows, bandwidth, assured maximum latency, queue number, queue cache and/or address cache in switches or bridges. In response to a reservation request from a first communication device, the data stream identifiers are preferably each made available to the respective first communication device by the superordinate communication controller. In addition, in order to assign their datagrams to a transmission queue, the data streams are each identified in accordance with the invention by their data stream identifier and their assignment to a virtual local area network, in particular in accordance with IEEE 802.1 CB.

If sufficient resources are available, then the superordinate communication controller configures at least each of the third communication devices, connected to a first or second communication device, in accordance with the invention, such that datagrams assigned to data streams are each queued in transmission queues reserved for data streams. In contrast, in the event of a lack of or uncertain availability of sufficient resources, the superordinate communication controller configures at least each of the third communication devices, connected to a first or second communication device, at least temporarily such that datagrams assigned to selected data streams are each queued in a transmission queue for data traffic that is handled without a specific quality of service assurance. The superordinate communication controller advantageously configures at least each of the third communication devices, connected to a first or second communication device, via entries in a respective forwarding database, for which virtual local area network is respectively assigned to a data stream and/or whether and/or the priority with which datagrams assigned to a data stream are each queued in a transmission queue reserved for data streams.

Overall, the present invention makes it possible to avoid reservation of resources for streams, the applications or associated processes of which have a lower priority than applications or processes for which resources are intended to be subsequently reserved, with the result that reservation of resources for streams can be ensured for high-priority applications or processes. This is particularly relevant to dynamic allocation of resources for streams during a bootstrapping process, in which an order in which reservation requests arrive is sometimes difficult to predict. With the present invention, it is therefore sufficient for initially only a respective stream ID in the communication system to be disclosed in response to stream reservation requests without resources being reserved immediately. This can be performed at a later time in accordance with the invention when there is an overview of all reservation requests to be taken into account, for example.

In accordance with one particularly preferred embodiment of the present invention, if sufficient resources are available, then the superordinate communication controller configures at least each of the third communication devices, connected to a first or second communication device, such that the data streams are each assigned to a virtual local area network and datagrams assigned to data streams are each queued, based on this assignment, in the respective transmission queues reserved for data streams. In contrast, in the event of a lack of or uncertain availability of resources, sufficient the superordinate communication controller advantageously configures at least each of the third communication devices, connected to a first or second communication device, at least temporarily such that selected data streams are each assigned to a virtual local area network, based on the assignment of which datagrams assigned to the respective selected data stream are each queued in the respective transmission queue for data traffic that is handled without a specific quality of service assurance. The assignment of the virtual local area network can therefore be used to change whether and/or the priority with which datagrams assigned to a data stream are each queued in a transmission queue reserved for data streams. It is therefore easily possible to dynamically give stream reservation requests a higher or lower priority by rewriting VLAN priority values in edge bridges or switches, depending on the network utilization.

The superordinate communication controller preferably creates an updated prioritization of all data streams in a time-controlled and/or event-controlled manner during ongoing operation of the communication system and determines, based on the updated prioritization and based on currently available resources, which data streams should be at least temporarily handled as selected data streams. In particular, the superordinate communication controller can configure at least each of the third communication devices, connected to a first or second communication device, while starting operation of the communication system, such that all data streams are initially each assigned to a virtual local area network, based on the assignment of which datagrams assigned to the respective selected data stream are each queued in the respective transmission queue for data traffic that is handled without a specific quality of service assurance. The superordinate communication controller advantageously creates a prioritization of all data streams after starting operation and determines, based on the prioritization and based on available resources, which data streams should be at least temporarily handled as selected data streams. This ensures, at least for high-priority control applications or processes, reliable reservation of resources for transmitting streams assigned to these control applications or processes.

In accordance with a particularly preferred embodiment of the present invention, the communication devices are connected to one another via a time-sensitive network, in particular according to IEEE 802.3-2018, IEEE 802.1Q-2018, IEEE 802.1AB-2016, IEEE 802.1AS-2011, IEEE 802.1BA-2011 and/or IEEE 802.1CB-2017. Here, forwarding of the selected datagrams is advantageously controlled via frame preemption, in particular in accordance with IEEE 802.1Q-2018, time-aware shaper, in particular in accordance with IEEE 802.1Q-2018, credit-based shaper, in particular in accordance with IEEE 802.1Q-2018, burst limiting shaper, peristaltic shaper and/or priority-based shaper.

In addition, transmission queues reserved for first data streams with increased real-time requirements, transmission queues reserved for second data streams without increased real-time requirements and transmission queues for data traffic without a specific quality of service assurance, in particular best-effort data traffic, are each preferably at least provided in the third communication devices. In this case, the superordinate communication controller initially reserves resources for transmitting the respective data stream via the third communication devices only for the first data streams in the event of sufficient availability and configures each of the third communication devices to handle the second data streams at least temporarily as selected data streams, i.e., as best-effort data traffic. If sufficient resources are available for transmitting the first data streams via the third communication devices, then the superordinate communication controller advantageously checks whether sufficient resources are available for transmitting the second data streams. Accordingly, the third communication devices are each configured to queue the datagrams assigned to the second data streams in the transmission queues reserved for the second data streams. Reservation of resources for successively transmitting data streams according a respectively assigned data traffic class is therefore ensured.

The objects and advantages are achieved in accordance with the invention by a communication controller provided for performing the method in accordance with the disclosed embodiments, where the communication controller comprises at least one terminal for connection to a communication device forwarding datagrams. The communication controller is configured to, in response to first datagrams transmitted by first communication devices for announcing data streams that can be subscribed to and in response to second datagrams transmitted by second communication devices for reserving resources to be provided by third communication devices for transmitting the data streams, respectively determine a path for the respective data stream and to, in the event of sufficient availability, reserve resources for transmitting the respective data stream via the third communication devices.

The communication controller in accordance with the invention is also configured to, if sufficient resources are available, configure at least each of the third communication devices, connected to a first or second communication device, such that datagrams assigned to data streams are each queued in transmission queues reserved for data streams. The communication controller is also configured to, in the event of a lack of or uncertain availability of sufficient resources, configure at least each of the third communication devices, connected to a first or second communication device, at least temporarily such that datagrams assigned to selected data streams are each queued in a transmission queue for data traffic that is handled without a specific quality of service assurance.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

The present invention is explained in more detail below using an exemplary embodiment with reference to the drawings, in which.

DETAILED DESCRIPTION OF THE EXEMPLARY EMBODIMENTS

Figure 1:
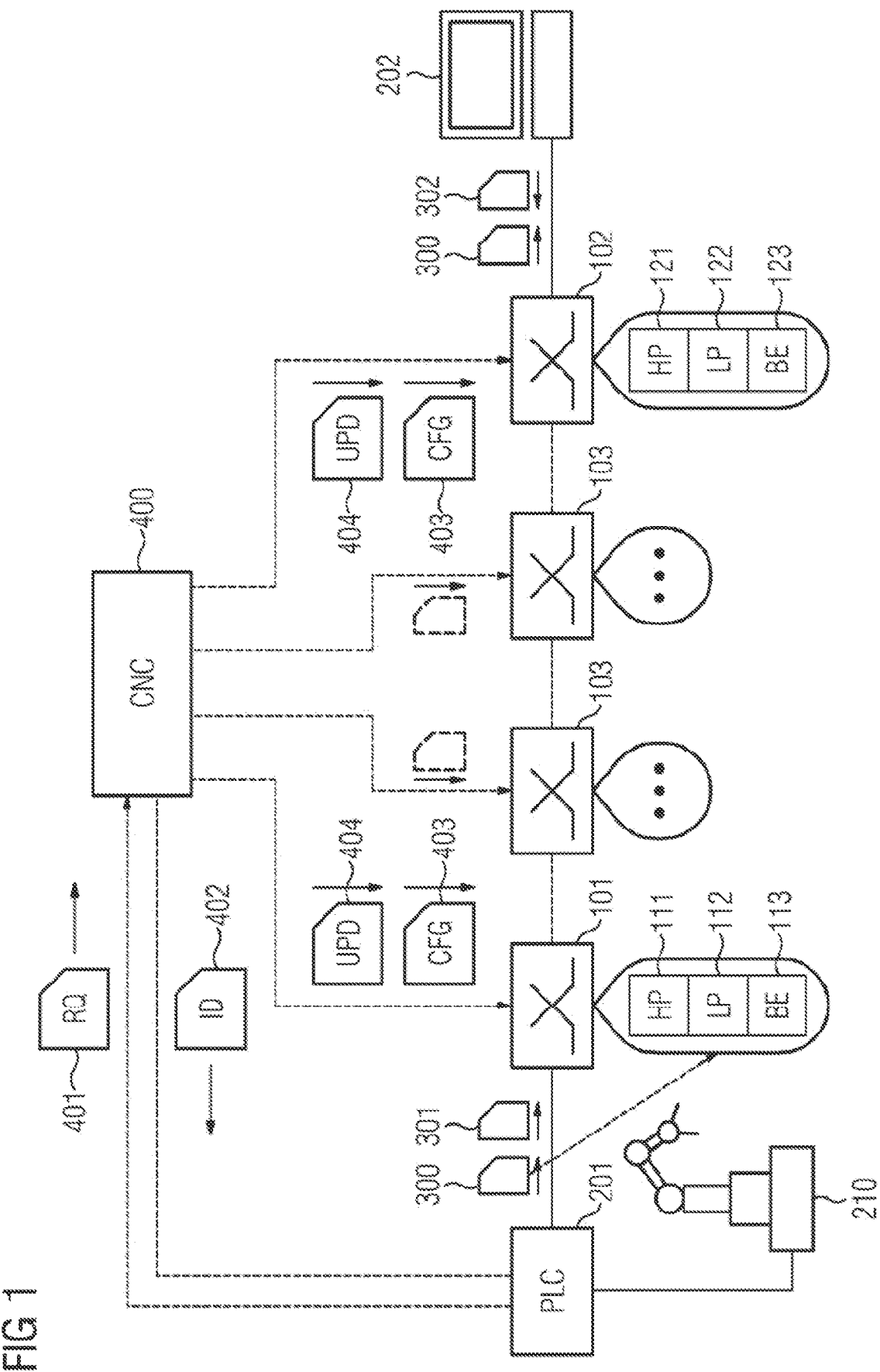
FIG. 1 shows a communication system comprising a plurality of communication devices for an industrial automation system in accordance with the invention.

The communication system illustrated in FIG. 1 for an industrial automation system has a plurality of bridges or switches 101, 102, 103 as communication devices forwarding datagrams and a superordinate controller assigned to the communication devices or a central network controller 400. The bridges or switches 101, 102, 103 each comprise a plurality of ports and a backplane switch as a coupling element and are used, in particular, to connect programmable logic controllers 201, operating and observation stations 202, I/O controllers or I/O modules, which are likewise communication devices or communication terminals. In the present exemplary embodiment, the communication system is in the form of a time-sensitive network, in particular in accordance with IEEE 802.3-2018, IEEE 802.1Q-2018, IEEE 802.1AB-2016, IEEE 802.1AS-2011, IEEE 802.1BA-2011 and IEEE 802.1CB-2017. Forwarding of data (frames) frames within the communication system can be controlled, for example, via frame preemption in accordance with IEEE 802.10-2018, time-aware shaper according to IEEE 802.1Q-2018, credit-based shaper in accordance with IEEE 802.1Q-2018, burst limiting shaper, peristaltic shaper or priority-based shaper.

Programmable logic controllers 201 typically each comprise a communication module, a central processing unit and at least one input/output unit. Input/output units may, in principle, also be formed as decentralized peripheral modules that are arranged in a manner remote from a programmable logic controller. A programmable logic controller 201 can be connected to a switch or a router or additionally to a field bus via the communication module. The input/output unit is used to exchange control and measurement variables between the programmable logic controller 201 and a machine or apparatus 210 controlled by the programmable logic controller 201. The central processing unit is provided, in particular, for the purpose of determining suitable control variables from captured measurement variables. The above components of the programmable logic controller 201 are connected to one another via a backplane bus system, for example.

I/O modules may also be provided, in principle, for the purpose of exchanging control and measurement variables with connected machines or apparatuses. I/O modules can be controlled, in particular, via an I/O controller for each automation cell. Alternatively, I/O modules can also be controlled via a remote programmable logic controller.

An operating and observation station 202 is used to visualize process data or measurement and control variables that are processed or captured by programmable logic controllers, input/output units or sensors. In particular, an operating and observation station 202 is used to display values from a regulation circuit and to change regulation parameters. Operating and observation stations 202 comprise at least a graphical user interface, an input device, a processor unit and a communication module.

First communication or automation devices, which have a talker or provider function in particular, are used to provide second communication or automation devices, which have a listener or consumer function in particular, with information or services relating to data streams for use. An automation device may have both one or more talker functions and one or more listener functions at the same time, for example, if the automation device provides automation services, on the one hand, and uses automation services of other devices, on the other hand.

The programmable logic controller 201 may provide measured values, for example, and may therefore have a talker function. In contrast, the operating and observation station 202 may have a listener function and may receive, in particular, information provided by the programmable logic controller 201. In principle, the operating and observation station 202 could analyze information received from the programmable logic controller 201 and could use the received information to specify control parameters for the programmable logic controller 201. Both the programmable logic controller 201 and the operating and observation station 202 may therefore perform both functions. Data streams are each therefore preferably set up in a bidirectional manner in response to reservation requests.

In order to transmit time-critical data, at least selected data frames (frames) 300 are assigned to data streams and are transmitted between first communication devices 201 with a talker function and second communication devices 202 with a listener function via paths comprising the bridges or switches 101, 102, 103. In the present exemplary embodiment, the programmable logic controller 201 represents a first communication device with a talker function, whereas the operating and observation station 202 represents a second communication device with a listener function. The bridges or switches 101, 102, 103 represent third communication devices forwarding datagrams.

In order to announce data streams that can be subscribed to, first communication devices, such as the programmable logic controller 201, each transmit first datagrams 301 comprising a data stream identifier and specify quality of service parameters for the respective data stream in the first datagrams 301. The data stream identifier is communicated to the respective first communication device, in response to a stream reservation request 401 addressed to a central network controller 400, via a message 402 that comprises the data stream identifier.

In order to reserve resources to be provided by the bridges or switches 101, 102, 103 for transmitting the data streams, second communication devices, such as the operating and observation station 202, each transmit second datagrams 302 and specify the respective data stream identifier in the second datagrams 302. The resources to be provided by the bridges or switches 101, 102, 103 comprise, in particular, usable transmission time windows, bandwidth, assured maximum latency, queue number, queue cache or address cache.

Figure 2:
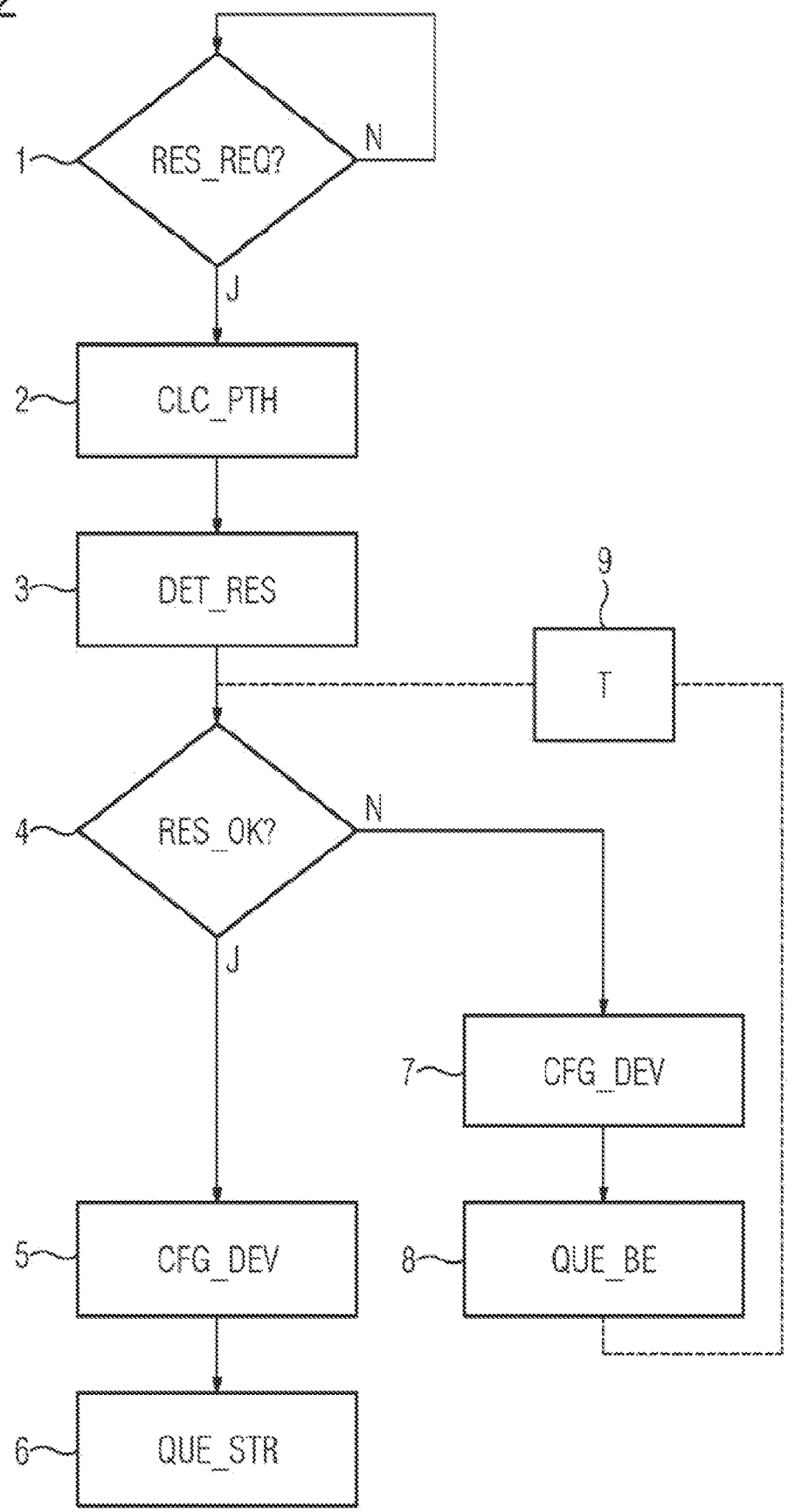
FIG. 2 shows a flowchart for reserving resources for transmitting data streams within the communication system of FIG. 1.

According to step 1 of the flowchart illustrated in FIG. 2, the central network controller 400 continuously checks whether reservation requests need to be fulfilled based on available first datagrams 301 and second datagrams 302. In the case of reservation requests, the central network controller 400 respectively determines a path for the respective data stream in response to the first datagrams 301 and second datagrams 302 (step 2). The central network controller 400 also determines, in accordance with step 3, resources needed to transmit the respective data stream via the bridges or switches 101, 102, 103. The central network controller 400 then checks whether sufficient resources are available for transmitting the respective data stream via the bridges or switches 101, 102, 103 (step 4). If this is the case, then the central network controller 400 reserves the required resources.

In particular, if sufficient resources are available, then the central network controller 400 configures at least the switch 101, connected to the programmable logic controller 201, and the switch 102, connected to the operating and observation station 202, in each case (step 5) such that data frames 300 assigned to data streams are each queued in transmission queues 111-112, 121-122 of the switches 101, 102 that are reserved for data streams (step 6). For this purpose, the central network controller 400 transmits messages 403 containing corresponding configuration data to the switches 101, 102. The other switches 103 along the respectively determined path can also be configured in a corresponding manner.

In the event of a lack of or uncertain availability of sufficient resources, the central network controller 400 configures at least the switch 101, connected to the programmable logic controller 201, and the switch 102, connected to the operating and observation station 202, in each case (step 7) such that data frames 300 assigned to selected data streams are each queued in a transmission queue 113, 123 for data traffic (step 8) which is handled without a specific quality of service assurance. This transmission queue assignment for the data frames assigned to the selected data streams can be changed, according to step 9, after expiry of a defined period of time or in an event-based manner, in particular if sufficient resources are available again.

In the present exemplary embodiment, transmission queues 111, 121 reserved for first data streams with increased real-time requirements, transmission queues 112, 122 reserved for second data streams without increased real-time requirements and transmission queues 113, 123 for best-effort data traffic are each at least provided in the switches 101-103. The central network controller 400 preferably initially reserves (for example during a system start) resources for transmitting the respective data stream via the switches 101, 102, 103 only for the first data streams in the event of sufficient availability and configures each of the switches 101, 102, 103 to handle the second data streams at least temporarily as selected data streams. The data frames assigned to the second data streams are therefore in this case at least temporarily handled as best-effort data traffic and are accordingly queued in the transmission queues 113, 123.

If sufficient resources are available for transmitting the first data streams via the switches 101-103, then the central network controller 400 can advantageously subsequently check whether sufficient resources are available for transmitting the second data streams. Accordingly, the switches 101, 102, 103 are each configured to queue the datagrams assigned to the second data streams in the transmission queues 112, 122 reserved for the second data streams.

In accordance with one preferred embodiment, if sufficient resources are available, then the central network controller 400 configures each of the switches 101, 102, 103 such that the data streams are each assigned to a virtual local area network (VLAN) and datagrams assigned to data streams are each queued, based on this assignment, in the respective transmission queues 111-112, 121-122 reserved for data streams. In addition, in this embodiment, in the event of a lack of or uncertain availability of sufficient resources, the central network controller 400 configures each of the switches 101, 102, 103 at least temporarily such that selected data streams are each assigned to a virtual local area network, based on the assignment of which datagrams assigned to the respective selected data stream are each queued in the respective transmission queue for data traffic that is handled without a specific quality of service assurance or as best-effort data traffic.

The assignment of the virtual local area network can be advantageously used to easily and reliably change whether the priority with which datagrams assigned to a data stream are each queued in a transmission queue reserved for data streams. For this purpose, the central network controller 400 transmits messages 404 containing updated configuration data to switches 101, 102, 103 each affected by such a change. The central network controller 400 uses the messages 403, 404 containing the configuration data or updated configuration data to configure the each of the switches 101, 102, 103, via entries in a respective forwarding database (FDB), for which virtual local area network is respectively assigned to a data stream and whether or the priority with which datagrams assigned to a data stream are each queued in a transmission queue reserved for data streams. In order to assign their data frames 300 to a transmission queue, the data streams are preferably each identified by their data stream identifier and their assignment to a virtual local area network, in particular in accordance with IEEE 802.1 CB.

The central network controller 400 can create an updated prioritization of all data streams, for example, during ongoing operation of the communication system, in a time-controlled or event-controlled manner and can determine, based on the updated prioritization and based on currently available resources, which data streams should be at least temporarily handled as selected data streams or as best-effort data traffic. In particular, the central network controller 400 can configure each of the switches 101, 102, 103, while starting operation of the communication system, such that all data streams are initially each assigned to a virtual local area network, based on the assignment of which data frames 300 assigned to the respective selected data stream are each queued in the respective transmission queue 113, 123 for best-effort data traffic. After the start of operation, the central network controller 400 creates a prioritization of all data streams and determines, based on the prioritization and based on available resources, which data streams should be at least temporarily handled as best-effort data traffic.

Thus, while there have been shown, described and pointed out fundamental novel features of the invention as applied to a preferred embodiment thereof, it will be understood that various omissions and substitutions and changes in the form and details of the methods described and the devices illustrated, and in their operation, may be made by those skilled in the art without departing from the spirit of the invention. For example, it is expressly intended that all combinations of those elements and/or method which steps perform substantially the same function in substantially the same way to achieve the same results are within the scope of the invention. Moreover, it should be recognized that structures and/or elements and/or method steps shown and/or described in connection with any disclosed form or embodiment of the invention be may incorporated in any other disclosed or described or suggested form or embodiment as a general matter of design choice. It is the intention, therefore, to be limited only as indicated by the scope of the claims appended hereto.

The invention claimed is:

1. A method for transmitting time-critical data within a communication system, the method comprising:
    assigning selected datagrams to data streams and transmitting the selected datagrams from first communication devices to second communication devices via paths comprising third communication devices;
    transmitting, by each of the first communication devices, first datagrams comprising a data stream identifier to announce data streams which are subscribeable to, quality of service parameters for a respective data stream being specified in the first datagrams;
    transmitting, by each of the second communication devices, second datagrams to reserve resources to be provided by the third communication devices for transmitting the data streams, a respective data stream identifier being specified in the second datagrams;
    determining respectively, by a superordinate communication controller, a path for the respective data stream in response to the first and second datagrams and reserving, by the superordinate communication controllers resources for transmitting the respective data stream via the third communication devices, in an event of sufficient availability;
    configuring, by the superordinate communication controller, at least third communication devices, connected to a first or second communication device, in each case to queue each datagram assigned to data streams in transmission queues reserved for data streams, if sufficient resources are available;
    identifying each of the data streams by a respective data stream identifier and a respective assignment to a virtual local area network to assign datagrams associated with each of the data streams to a transmission queue; and
    configuring, by the superordinate communication controller at least the third communication devices, connected to a first or second communication device, in each case at least temporarily to queue each of the datagrams assigned to selected data streams in a transmission queue for data traffic which is handled without a specific quality of service assurance in an event of a lack of or uncertain availability of sufficient resources.

2. The method as claimed in claim 1, wherein if sufficient resources are available, the superordinate communication controller configures at least third communication devices, connected to a first or second communication device, in each case to assign each of the data streams to a virtual local area network and to queue each of the datagrams assigned to data streams, based on said assignment, in the respective transmission queues reserved for data streams; and
    wherein, in the event of a lack of or uncertain availability of sufficient resources, the superordinate communication controller configures at least the third communication devices, connected to the first or second communication device, in each case at least temporarily to assign each of the selected data streams to a virtual local area network, based on an assignment of which datagrams assigned to the respective selected data stream are each queued in the respective transmission queue for data traffic which is handled without a specific quality of service assurance.

3. The method as claimed in claim 2, wherein the assignment of the virtual local area network is utilized to change at least the priority with which datagrams assigned to a data stream are each queued in a transmission queue reserved for data streams.

4. The method as claimed in claim 2, wherein the superordinate communication controller creates an updated prioritization of all data streams in at least one of a time-controlled and event-controlled manner during ongoing operation of the communication system and determines, based on the updated prioritization and based on currently available resources, which data streams should be at least temporarily handled as selected data streams.

5. The method as claimed in claim 3, wherein the superordinate communication controller creates an updated prioritization of all data streams in at least one of a time-controlled and event-controlled manner during ongoing operation of the communication system and determines, based on the updated prioritization and based on currently available resources, which data streams should be at least temporarily handled as selected data streams.

6. The method as claimed in claim 2, wherein the superordinate communication controller configures at least the third communication devices, connected to the first or second communication device, while starting operation of the communication system in each case to initially assign all data streams to a virtual local area network, based on the assignment of which datagrams assigned to the respective selected data stream are each queued in the respective transmission queue for data traffic which is handled without a specific quality of service assurance.

7. The method as claimed in claim 3, wherein the superordinate communication controller configures at least the third communication devices, connected to the first or second communication device, while starting operation of the communication system in each case to initially assign all data streams to a virtual local area network, based on the assignment of which datagrams assigned to the respective selected data stream are each queued in the respective transmission queue for data traffic which is handled without a specific quality of service assurance.

8. The method as claimed in claim 4, wherein the superordinate communication controller configures at least the third communication devices, connected to the first or second communication device, while starting operation of the communication system in each case to initially assign all data streams to a virtual local area network, based on the assignment of which datagrams assigned to the respective selected data stream are each queued in the respective transmission queue for data traffic which is handled without a specific quality of service assurance.

9. The method as claimed in claim 6, wherein the superordinate communication controller creates a prioritization of all data streams after starting operation and determines, based on the prioritization and based on available resources, which data streams should be at least temporarily handled as selected data streams.

10. The method as claimed in claim 1, wherein the data stream identifiers are each made available to the respective first communication device by the superordinate communication controller in response to a reservation request from the first communication device.

11. The method as claimed in claim 1, wherein the superordinate communication controller configures at least one of (i) at least the third communication devices, connected to a first or second communication device, in each case via entries in a respective forwarding database, for which virtual local area network is respectively assigned to a data stream and (i) at least the priority with which datagrams assigned to a data stream are each queued in a transmission queue reserved for data streams.

12. The method as claimed in claim 1, wherein the resources to be provided by the third communication devices comprise at least one of usable transmission time windows, bandwidth, assured maximum latency, queue number, queue cache and address cache in switches or bridges.

13. The method as claimed in claim 1, wherein the first and second communication devices are connected to one another via a time-sensitive network.

14. The method as claimed in claim 13, wherein the time-sensitive network is in accordance with at least one of Institute of Electrical and Electronics Engineers 802.3-2018, IEEE 802.1Q-2018, IEEE 802.1AB-2016, IEEE 802.1AS-2011, IEEE 802.1BA-2011 and IEEE 802.1CB-2017.

15. The method as claimed in claim 13, wherein forwarding of the selected datagrams is controlled via frame preemption.

16. The method as claimed in claim 15, wherein the frame preemption is in accordance with Institute of Electrical and Electronics Engineers 802.1Q-2018.

17. The method as claimed in claim 16, wherein the IEEE 802.1Q-2018 is in accordance with at least one of time-aware shaper, credit-based shaper, burst limiting shaper, peristaltic shaper and priority-based shaper.

18. The method as claimed in claim 12, wherein transmission queues reserved for first data streams with increased real-time requirements, transmission queues reserved for second data streams without increased real-time requirements and transmission queues for data traffic without a specific quality of service assurance comprising best-effort data traffic, are each at least provided in the third communication devices; and wherein the superordinate communication controller initially reserves resources for transmitting the respective data stream via the third communication devices only for the first data streams in an event of sufficient availability and configures each of the third communication devices to handle the second data streams at least temporarily as selected data streams.

19. The method as claimed in claim 13, wherein transmission queues reserved for first data streams with increased real-time requirements, transmission queues reserved for second data streams without increased real-time requirements and transmission queues for data traffic without a specific quality of service assurance comprising best-effort data traffic, are each at least provided in the third communication devices; and wherein the superordinate communication controller initially reserves resources for transmitting the respective data stream via the third communication devices only for the first data streams in an event of sufficient availability and configures each of the third communication devices to handle the second data streams at least temporarily as selected data streams.

20. The method as claimed in claim 18, wherein if sufficient resources are available for transmitting the first data streams via the third communication devices, then the superordinate communication controller checks whether sufficient resources are available for transmitting the second data streams and accordingly configures each of the third communication devices to queue datagrams assigned to the second data streams in the transmission queues reserved for the second data streams.

21. A communication controller comprising:
- at least one terminal including a processor and memory, said at least one terminal being connectable to a communication device forwarding datagrams;
- wherein the communication controller is configured to, in response to first datagrams transmitted by first communication devices for announcing data streams which are subscribeable to and in response to second datagrams transmitted by second communication devices for reserving resources to be provided by third communication devices for transmitting the data streams, respectively determine a path for the respective data stream and, in an event of sufficient availability, to reserve resources for transmitting the respective data stream via the third communication devices;
- wherein the communication controller is further configured to configure the at least third communication devices, connected to a first or second communication device of the first or second communication devices, to queue each datagram assigned to data streams in transmission queues reserved for data streams if sufficient resources are available;
- wherein the communication controller is further configured to identify each of the data streams by a respective data stream identifier and an associated assignment to a virtual local area network to assign their datagrams to a transmission queue;
- wherein the communication controller is further configured to, in an event of a lack of or uncertain availability of sufficient resources, configure at least the third communication devices, connected to a first or second communication device, in each case at least temporarily to queue each of the datagrams assigned to selected data streams in a transmission queue for data traffic which is handled without a specific quality of service assurance.

* * * * *